Sept. 28, 1926.
G. M. MELOSCH
1,601,638
GLARESHIELD FOR VEHICLES
Filed Jan. 30, 1925    2 Sheets-Sheet 1
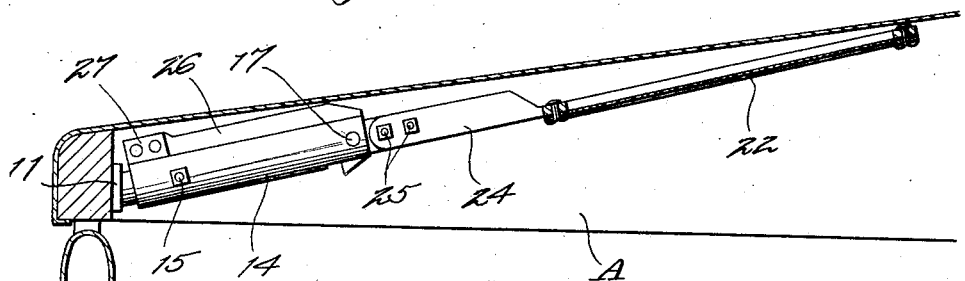
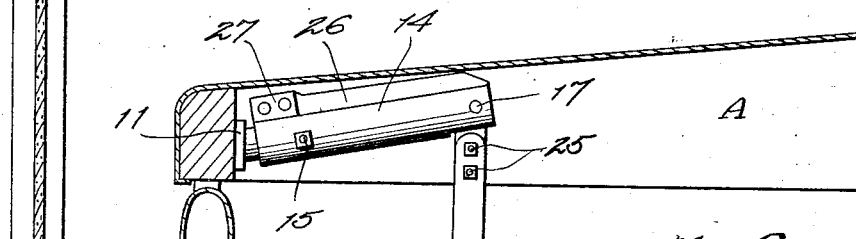
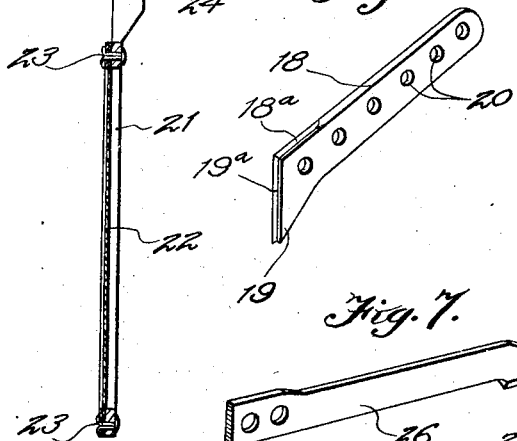
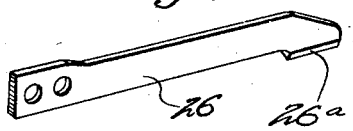
Geo. M. Melosch
INVENTOR
BY Victor J. Evans
ATTORNEY
WITNESS: R. E. Wise Sept. 28, 1926.
G. M. MELOSCH
1,601,638
GLARESHIELD FOR VEHICLES
Filed Jan. 30, 1925    2 Sheets-Sheet 2
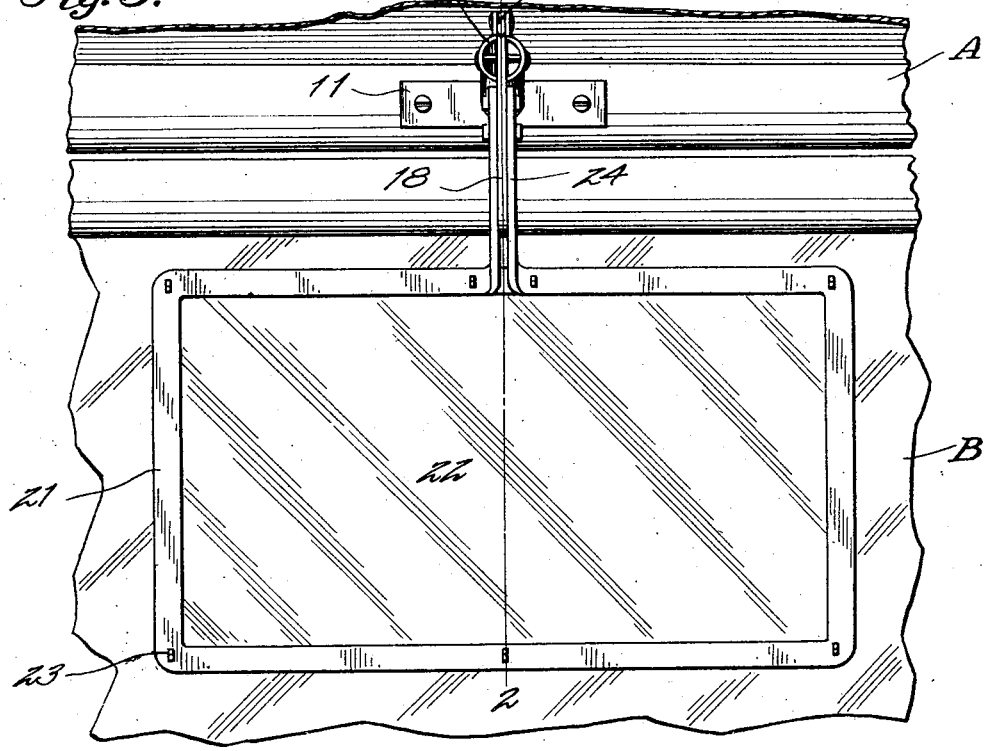
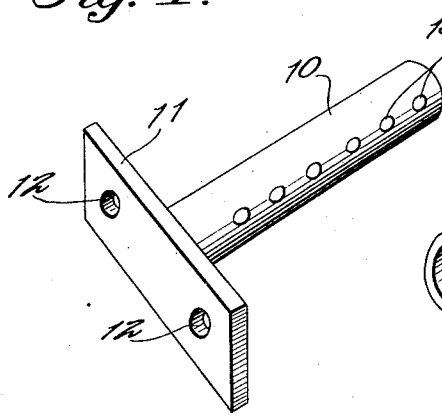
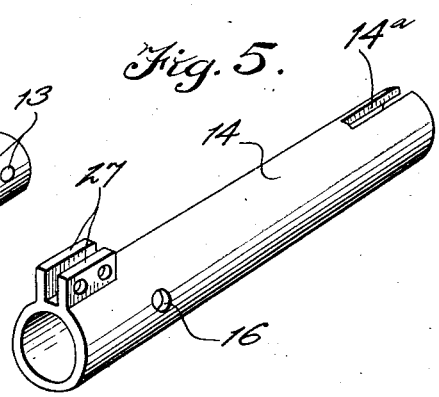
Geo. M. Melosch
INVENTOR
BY Victor J. Evans
ATTORNEY
WITNESS:

Patented Sept. 28, 1926.

1,601,638

UNITED STATES PATENT OFFICE.

GEORGE M. MELOSCH, OF HARRISBURG, PENNSYLVANIA.

GLARESHIELD FOR VEHICLES.

Application filed January 30, 1925. Serial No. 5,865.

This invention relates to attachments to or accessories for use in connection with automobiles or the like and has for its object the provision of a novel shield adapted to be mounted upon the front portion of an automobile inwardly of the windshield and so constructed and arranged as to be capable of being brought into the line of vision of the operator for the purpose of absorbing and preventing the glare from oncoming headlights and the reflection of the sun on white or light colored roads.

An important object is the provision of a device of this character equipped with spring means for holding it selectively in operative or inoperative position depending upon whether its use is desired or not.

A further object is the provision of a device of this character which is fully adjustable whereby it may be brought closer to or farther from the eyes of the operator or brought into a selected height above the floor or seat of the car to accommodate drivers of different statures.

An additional object is the provision of a device of this character which would be simple and inexpensive in manufacture, easy to install, operate and adjust, positive in action, efficient and durable in service, and a general improvement in the art.

With the above and other objects and advantages in view, the invention consists in the details of construction to be hereinafter more fully described and claimed, and illustrated in the accompanying drawings, in which:

Figure 1 is a fragmentary vertical section through the front portion of the top of an automobile showing the windshield and showing my device in applied position but swung into its inoperative position.

Figure 2 is a similar view showing the shield swung into its active or operative position.

Figure 3 is a front elevation,

Figure 4 is a detail perspective view of the attaching member,

Figure 5 is a detail perspective view of the adjustable barrel,

Figure 6 is a detail perspective view of the retaining member.

Figure 7 is a detail perspective view of the leaf spring.

Referring more particularly to the drawings, the letter A designates a portion of the top of a motor vehicle, and B represents the windshield. Carrying out the invention I provide a support which in the present instance is represented as being of elongated cylindrical form and including a shank 10 provided at one end with an attaching plate portion 11 apertured at 12 for the passage of screws or the like by means of which this element may be mounted against the inner face of the front portion of the top bow A, in case of a touring car, or against the inside of the car frame in the event that the device is installed upon a sedan or other closed car. Throughout its length the shank 10 is provided with a plurality of holes 13 for adjusting purposes as will be described.

The device further includes a barrel 14 which is tubular and which is slidably engaged upon the shank 10 and adapted to be held thereon by means of a bolt 15 or the like passing through a single hole 16 in the barrel member 14 and through a selected one of the holes 13 in the shank 10. One end of the barrel is formed with a slot $14^a$ and pivoted therein, by means of a transverse bolt or the like, is a link 18 having a toe piece 19 and formed with a plurality of holes 20 located at intervals throughout its length. For a short distance back from the toe piece, the edge of the member 18 is preferably grooved at $18^a$ and the end of the toe piece is grooved at $19^a$.

The shield itself comprises a suitable frame of any desired size and shape carrying or containing a sheet 22 of translucent or transparent material which may be smoked, frosted, tinted or otherwise treated to absorb glare. In actual practice this sheet 22 may be secured to the frame 21 by removable fasteners indicated at 23 so that a sheet of different material may be inserted when needed or a battered sheet replaced by a new one. Preferably at the center of its top portion the frame 21 is provided with spaced arms 24 which are located against opposite sides of the link 18 and secured thereto by means of bolts 25 or the like passing through suitable holes in the arms and through selected ones of the holes 20 in the link 18. By means of this adjustment at this point it will be obvious that the height of the shield itself with respect to the floor of the car may be varied to meet different conditions such as, for instance, differences in the height or statures of different drivers. The adjustability of the barrel 14 along the shank 10 is of importance inasmuch as it makes it possible to locate the shield at a certain preferred distance of the driver's eyes to secure the best results.

In order that the device may be held selectively in a desired position, I make use of an elongated leaf spring 26 which is located above the barrel 14 and which is secured as for instance by being riveted or otherwise fastened between ears 27 formed on the forward end of the barrel. The free end of this spring is beveled or otherwise formed to provide a ridge 26ª which bears against the link 18 and it is obvious that when the shield is in the upwardly inclined or inoperative position against the top, as shown in Figure 1 the spring engaging against the grooved edge of the link will operate to retain the shield firmly and prevent dropping down or rattling thereof. At the same time, it is obvious that when the shield is swung down into its operative or vertical position as shown in Figure 2 the engagement of the spring against the grooved end of the toe portion of the link will operate to maintain the shield in this desired position so that it cannot become accidentally displaced. Regardless of the position in which the shield is placed it is evident that the spring will maintain the position. In fact the action of the link 18 and the spring 26 is very similar to what occurs in connection with the blade of a pocket knife.

From the foregoing description and a study of the drawings it will be apparent that I have thus provided a simply constructed, inexpensive and easily installed device for the purpose specified which will be highly advantageous in taking up or absorbing the glare from oncoming headlights so that driving will be made much safer at night. Furthermore, if the operator will use the device when traveling along shell or other light colored roads when the sun is beating down it is apparent that the glare from such roads will be absorbed and driving made more comfortable.

While I have shown and described the preferred embodiment of the invention it should be understood that I reserve the right to make such changes in the form, construction and arrangement of parts as will not depart from the spirit of the invention or the scope of the subjoined claims.

Having thus described the invention, I claim:

1. In a device of the character described, a supporting member having an attaching portion and adapted to be mounted above the windshield of a vehicle, a tubular supporting member telescopically adjustable upon said first named supporting member, a link pivotally mounted at the outer end of said second named supporting member, a shield carried by said link, said link being swingable whereby the shield may be disposed selectively in horizontal or vertical position, and means carried by the second named supporting member and engageable with the link for maintaining the latter in a selected position, said means comprising an elongated leaf spring located above and extending longitudinally of the tubular supporting member having one end secured thereto and having its other end engaging against the link.

2. In a device of the character described, a supporting member of cylindrical form provided at one end with an attaching plate whereby it may be mounted adjacent the windshield of a motor vehicle, said member being formed throughout its length with a series of transverse holes, a tubular member telescopically engaged upon said cylindrical member and provided near one end with spaced ears, said tubular member having a transverse hole adapted to be brought selectively into registration with one of said series of holes, a securing element passing through the registering holes, the outer end of said tubular member being formed with a longitudinal slot arranged in alinement with the space between said ears, a frame covered with light obstructing material, a link carrying said frame and pivotally connected with the tubular member with its pivoted ends extending thereinto, an elongated leaf spring arranged exteriorly of said tubular supporting member and longitudinally with respect thereto with one end secured between said pair of ears and its other end extending in obstructing relation to said slot, the free end of the spring toward the tubular member being formed with a knife edge, and the end and one edge of the link being grooved to receive said knife edge, said spring operating to hold the link in a selected position.

In testimony whereof I affix my signature.

GEORGE M. MELOSCH.